(12) United States Patent
Jung

(10) Patent No.: US 10,992,601 B2
(45) Date of Patent: Apr. 27, 2021

(54) PACKET PROCESSING METHOD AND APPARATUS IN MULTI-LAYERED NETWORK ENVIRONMENT

(71) Applicant: GUBERNET INC., Daejeon (KR)

(72) Inventor: Kiung Jung, Daejeon (KR)

(73) Assignee: GUBERNET INC., Daejeon (KR)

( * ) Notice: Subject to any disclaimer, the term of this patent is extended or adjusted under 35 U.S.C. 154(b) by 0 days.

(21) Appl. No.: 16/372,821

(22) Filed: Apr. 2, 2019

(65) Prior Publication Data
US 2020/0127948 A1 Apr. 23, 2020

(30) Foreign Application Priority Data

Oct. 19, 2018 (KR) .......................... 10-2018-0124927
Jan. 28, 2019 (KR) .......................... 10-2019-0010661

(51) Int. Cl.
*H04L 12/00* (2006.01)
*H04L 12/861* (2013.01)
*G06F 9/445* (2018.01)

(52) U.S. Cl.
CPC .......... *H04L 49/9005* (2013.01); *G06F 9/445* (2013.01)

(58) Field of Classification Search
CPC ..... G06F 9/445; H04L 49/9005; H04L 69/22; H04L 47/6275; H04L 49/9063; H04L 49/9089; H04L 69/16; H04L 12/413; H04L 12/4633; H04L 12/4641; H04L 41/0896; H04L 45/745; H04L 47/22; H04L 47/2441; H04L 47/6225
See application file for complete search history.

(56) References Cited

U.S. PATENT DOCUMENTS

| | | | |
|---|---|---|---|
| 9,130,867 B2* | 9/2015 | Karino | H04L 49/70 |
| 9,867,079 B2* | 1/2018 | Eriksson | H04L 47/14 |
| 9,967,201 B2* | 5/2018 | Xu | H04L 41/0896 |
| 2014/0201845 A1* | 7/2014 | Anantharam | H04L 63/0428 726/26 |
| 2017/0160928 A1* | 6/2017 | Jaffari | G06F 13/1684 |
| 2017/0272312 A1* | 9/2017 | Aybay | G06F 13/4022 |
| 2018/0048551 A1* | 2/2018 | Lee | H04L 43/0882 |
| 2018/0191632 A1* | 7/2018 | Biederman | H04L 69/22 |

FOREIGN PATENT DOCUMENTS

| | | |
|---|---|---|
| JP | 2018-029230 A | 2/2018 |
| KR | 10-1639797 B1 | 7/2016 |

OTHER PUBLICATIONS

Office Action dated Apr. 19, 2019, by the Korean Intellectual Property Office in corresponding Korean Patent Application No. 10-2019-0010661. (65 pages).

* cited by examiner

*Primary Examiner* — Phuc H Tran
(74) *Attorney, Agent, or Firm* — Buchanan Ingersoll & Rooney PC

(57) ABSTRACT

A packet processing method and apparatus in a multi-layered network environment are provided. When a packet including layer information of at least one second network is received from a first network, the packet processing apparatus identifies a deep flow for the packet based on the layer information of the at least one second network included in the packet. The packet processing apparatus maps at least one deep flow to at least one sub-channel obtained by dividing a channel allocated to a virtual processing module (VPM) located in the at least one second network, and transmits the packet or another packet generated by processing the packet to the VPM through the at least one sub-channel.

11 Claims, 7 Drawing Sheets

PACKET PROCESSING METHOD AND APPARATUS IN MULTI-LAYERED NETWORK ENVIRONMENT

CROSS-REFERENCE TO RELATED APPLICATIONS

This application claims the benefit of Korean Patent Application Nos. 10-2018-0124927 and 10-2019-0010661, respectively filed on Oct. 19, 2018 and Jan. 28, 2019, in the Korean Intellectual Property Office, the disclosures of which are incorporated herein in their entirety by reference.

BACKGROUND

1. Field

One or more embodiments relate to a packet processing method and apparatus in a multi-layered network environment, and more particularly, to a method and apparatus for identifying and processing a packet flow between two networks. The invention is based on a project supported by the Ministry of Science, ICT & Future Planning (Task No.: 2010-0-01276, Ministry Name: Ministry of Science, ICT & Future Planning, R&D Management Agency: National IT Industry Promotion Agency, Research Project: Development of NIC supporting inter-virtual machine networking performance using virtual flow affinity-based multi-core dynamic allocation synchronization technology, Agency in Charge: Gubernet Inc., Period: 2017.5.1-2018.12331)

2. Description of the Related Art

As Internet traffic has recently increased rapidly, the capacities and speeds of servers have also increased rapidly. Virtualization of servers has been accelerated in order to prevent an increase in physical volumes and reduce costs according to increasing capacities of servers. As capacities, speeds, and virtualization of servers increase, high efficiency of parallel processing of large data received from physical networks is required. Also, when a virtual switch function is performed in a virtualization server, performance degrades as a load of the virtualization server increases, and thus, technology for transferring the load of the virtualization server according to the virtualization switch function to a physical network interface device is required.

A conventional network interface card (NIC) that supports a virtualization environment has attempted to generate and manage queues in the unit of virtual machine (VM) by using a method of supporting the virtualization environment in a physical network interface device and reduce a bottleneck between the physical network interface device and a virtual switch of a server. However, in this case, allocation of processors and re-distribution of the queues for parallel processing of received data packets are performed only in the unit of VM. That is, the allocation of the processors is performed only by considering physical layers of the virtualization environment. Accordingly, processor affinity that is one of the very important factors for improving processing efficiency in the parallel processing in the virtualization network may not be considered and the allocation of the processors and the re-distribution of the queues may be performed only by considering loads of the processors, thereby reducing efficiency in the parallel processing.

SUMMARY

One or more embodiments include a method and apparatus for identifying and processing a packet in a multi-layered network environment in the unit of deep flow.

Additional aspects will be set forth in part in the description which follows and, in part, will be apparent from the description, or may be learned by practice of the presented embodiments.

According to one or more embodiments, a packet processing method in a multi-layered network includes: receiving a packet including layer information of at least one second network from a first network; identifying a deep flow for the packet based on the layer information of the at least one second network included in the packet; mapping at least one deep flow to at least one sub-channel obtained by dividing a channel allocated based on a virtual processing module (VPM) located in the at least one second network; and transmitting the packet or another packet generated by processing the packet to the VPM through the at least one sub-channel.

According to one or more embodiments, a packet processing apparatus includes: a packet identifier configured to, based on layer information of a second network included in a packet received from a first network, identify a deep flow for the packet; a scheduler configured to map at least one deep flow to at least one sub-channel obtained by dividing a channel allocated based on a virtual processing module (VPM) located in the second network; and a packet distributer configured to transmit the packet or another packet generated by processing the packet to the VPM through the at least one sub-channel.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
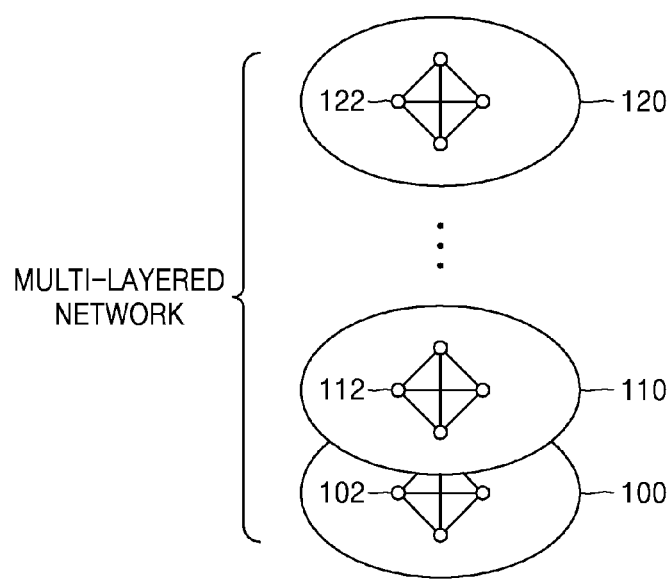
FIG. 1 is a diagram illustrating a multi-layered network environment to which a packet processing method according to an embodiment of the disclosure is applied.

Reference will now be made in detail to embodiments, examples of which are illustrated in the accompanying drawings, wherein like reference numerals refer to like elements throughout.

FIG. 1 is a diagram illustrating a multi-layered network environment to which a packet processing method according to an embodiment of the disclosure is applied.

Referring to FIG. 1, the multi-layered network environment includes at least two networks, for example, first, second, . . . , and N$^{th}$ networks 100, 110, . . . , and 120. The first network 100 may include a plurality of physical nodes, and the second through N$^{th}$ networks 110 through 120 may include a plurality of logical nodes. For example, the first network 100 may be a physical network including a physical server (host), and each of the second through N$^{th}$ networks 110 through 120 may be a virtualization network including a virtual machine (VM) or a container in the physical server.

Layer information of the first network 100 through the N$^{th}$ network 120 is sequentially encapsulated in a packet transmitted between nodes located in the N$^{th}$ network 120. Nodes of the first network 100 communicate with one another by using the layer information of the first network 100 included in the packet, nodes of the second network 110 communicate within each layer by using the layer information of the second network 110, and nodes of the N$^{th}$ network 120 communicate within each layer by using the layer information of the N$^{th}$ network 120.

When a packet flow is identified by using layer information of each network for each network layer, a packet may be identified as a different flow for each layer. In the present embodiment of the disclosure, for example, one common flow may be identified by using layer information of all network layers via which a packet is transmitted. In this case, parallel processing efficiency may be improved due to consistent processor allocation based on the same flow from the first network 100 to the N$^{th}$ network 120, and a function may be performed and a differentiated service may be provided based on the flow for end point of a virtualization server.

For convenience of explanation, a node of a virtualization network such as a VM or a container is referred to as a virtual processing module (VPM), and flow identified according to the present embodiment of the disclosure in a multi-layered network environment is referred to as a deep flow.

Figure 2:
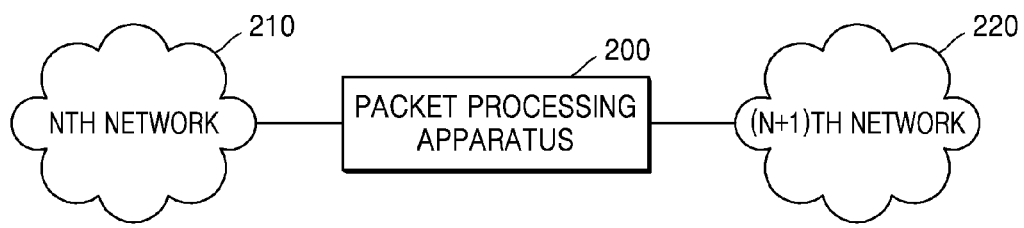
FIG. 2 is a diagram illustrating a location of a packet processing apparatus according to an embodiment of the disclosure.

FIG. 2 is a diagram illustrating a location of a packet processing apparatus 200 according to an embodiment of the disclosure.

Referring to FIG. 2, the packet processing apparatus 200 may be located between two networks, for example, N$^{th}$ and (N+1)$^{th}$ networks 210 and 220, in a multi-layered network environment. For example, the packet processing apparatus 200 may process a packet between a first network that is a physical network and a second network that is a virtualization network including a VPM. Alternatively, the packet processing apparatus 200 may be implemented as a network interface card (NIC) connected to hosts 320 and 322 each including a virtualization network as shown in FIG. 3.

In another embodiment of the disclosure, the packet processing apparatus 200 may be located between two virtualization networks, for example, a second network and a third network as shown in FIG. 1. In this case, the packet processing apparatus 200 may be implemented as a virtualization module such as a VM. For example, when a second network including a VM exists in a host and a third virtualization network including another logical node exists in the VM, the packet processing apparatus 200 may be implemented as a virtualization module for processing a packet between the second network and the third network.

Figure 3:
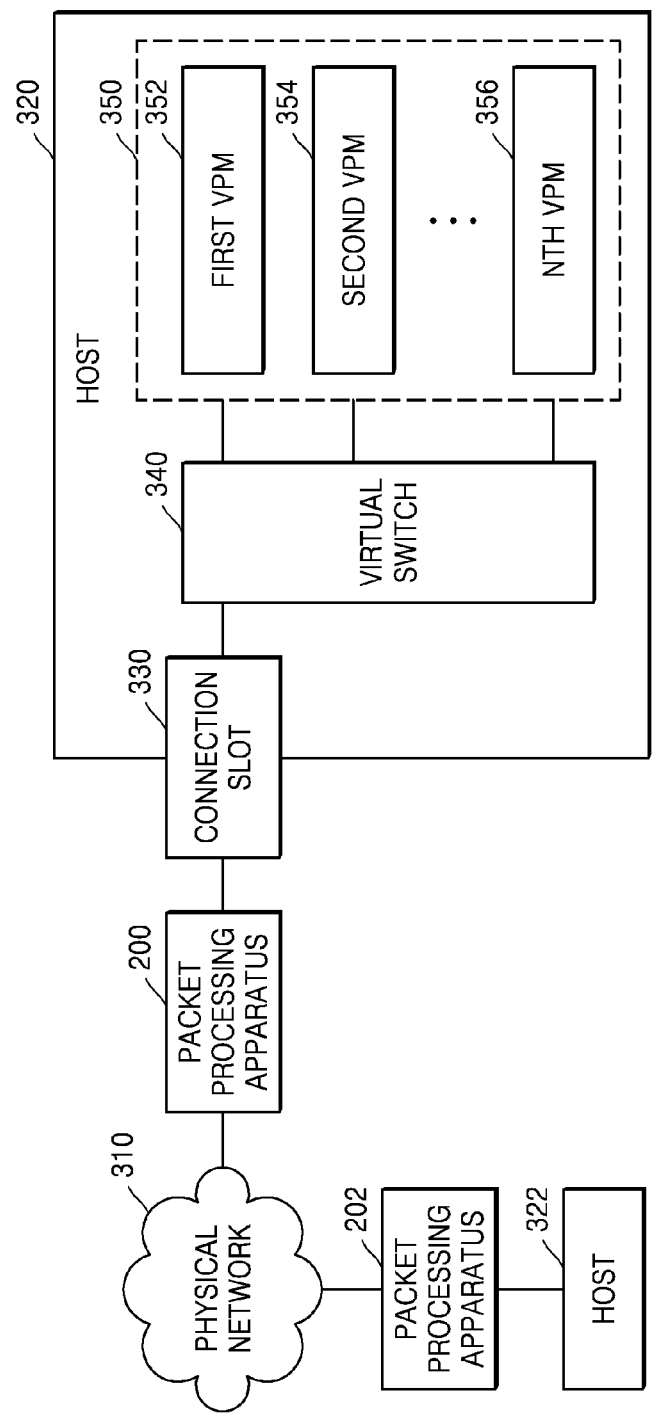
FIG. 3 is a diagram of a packet processing apparatus between a physical network and a virtualization network according to an embodiment of the disclosure.

FIG. 3 is a diagram of a packet processing apparatus between a physical network and a virtualization network according to an embodiment of the disclosure.

Referring to FIG. 3, the packet processing apparatuses 200 and 202 are located between a physical network 310 and the hosts 320 and 322 each including a virtualization network. Although the packet processing apparatuses 200 and 202 are between the physical network 310 and the hosts 320 and 322 for convenience of explanation in the present embodiment of the disclosure, one host 320 or 322 may be connected to the physical network 310 by using a general network connection device without the packet processing apparatus 200 or 202.

The packet processing apparatuses 200 and 202 may be placed in connection slots 330 of the hosts 320 and 322. For example, the connection slot 330 may be a peripheral component interconnect express (PCIe) slot. Various other connection slots may be applied to the present embodiment of the disclosure. Alternatively, the packet processing apparatuses 200 and 202 may be connected to the hosts 320 and 322 by wire or wirelessly.

Each of the hosts 320 and 322 includes at least one VPM 350. First, second, . . . , and N$^{th}$ VPMs 352, 354, . . . and 356 in the host 320 constitute the virtualization network. When a packet flow identification process for the virtualization network is performed in the virtualization network in the host 320, a process of identifying a flow may be performed not only in the virtualization network but also in the physical network 310 separately and the same packet may be identified as different flows in the physical network 310 and the virtualization network.

Accordingly, instead of identifying a packet flow for the virtualization network in the virtualization network, the present embodiment of the disclosure previously identifies a deep flow for end point of the virtualization network before the packet processing apparatus 200 located between the physical network 310 and the virtualization network transmits a packet to the virtualization network, which corresponds to an edge function for previously identifying and processing a flow for the end point of the virtualization network in an inputter/outputter of an external network on which one virtualization network is overlaid. Also, the present embodiment of the disclosure divides a channel between the packet processing apparatus 200 and the host 320 into sub-channels based on the deep flow and generates a deep flow-based single channel structure to directly connect between the packet processing apparatus 200 and the VPMs 352, 354, . . . , and 356, thereby reducing a bottleneck at the channel.

Figure 4:
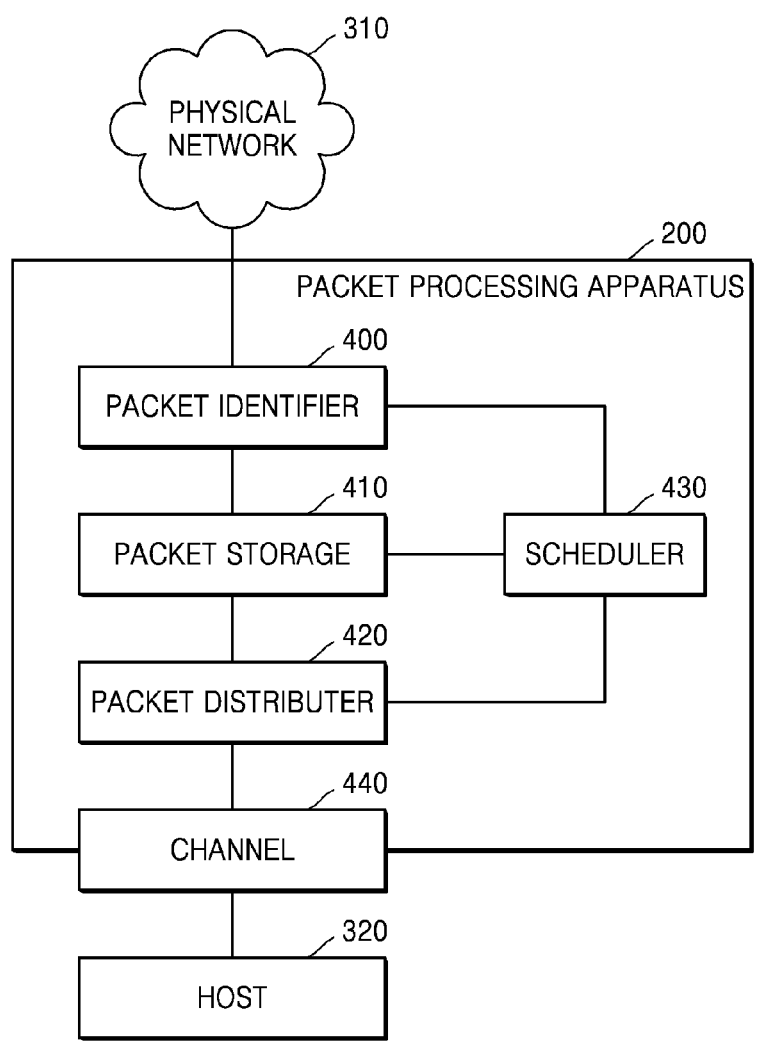
FIG. 4 is a diagram illustrating a configuration of the packet processing apparatus according to an embodiment of the disclosure.

FIG. 4 is a diagram illustrating a configuration of the packet processing apparatus 200 according to an embodiment of the disclosure.

Referring to FIG. 4, the packet processing apparatus 200 includes a packet identifier 400, a packet storage 410, a packet distributer 420, and a scheduler 430. The packet distributer 420 may include a general virtual switch. At least one channel 440 is located between the packet processing apparatus 200 and the host 320. For example, the packet processing apparatus 200 and the host 320 may be connected to each other through a PCIe channel. A channel may be formed between the packet processing apparatus 200 and the host 320 by using any of various other methods. Although the packet processing apparatus 200 is located between the physical network 310 and a virtualization network as shown in FIG. 3 for convenience of explanation in the present embodiment of the disclosure, the disclosure is not limited thereto and the packet processing apparatus 200 may be implemented as a virtualization module between two virtualization networks as shown in FIGS. 1 and 2.

The packet identifier 400 receives a packet from the physical network 310. The packet includes layer information of at least two networks. When the physical network 310 and one virtualization network exist as in the present embodiment of the disclosure, the packet may include open system interconnection (OSI) 7 layer information of the physical network 310 and OSI 7 layer information of the virtualization network.

The layer information of the virtualization network may be encapsulated in the packet by using a tunneling method or the like. In this case, when the packet identifier 400 recognizes that the layer information of the virtualization network is encapsulated in the packet received from the physical network 310, the packet identifier 400 may obtain the layer information of the virtualization network from the packet received from the physical network 310. A process for identifying network layer information encapsulated in the packet is referred to as deep packet inspection (DPI).

The packet identifier 400 may identify a deep flow of the packet by using both the layer information of the physical network 310 and the layer information of the virtualization network or by using only the layer information of the virtualization network. The packet identifier 400 may determine the deep flow of the packet by analyzing layer (L) 2 to L7 information of the virtualization network. For example, the packet identifier 400 may recognize a destination VPM of the packet by using the layer information of the virtualization network and may classify packets toward the same VPM as at least one flow according to traffic attributes recognized by using L3 or higher layer information of the virtualization network. Various methods of identifying a flow by using network layer information may be applied to the present embodiment of the disclosure.

Figure 5:
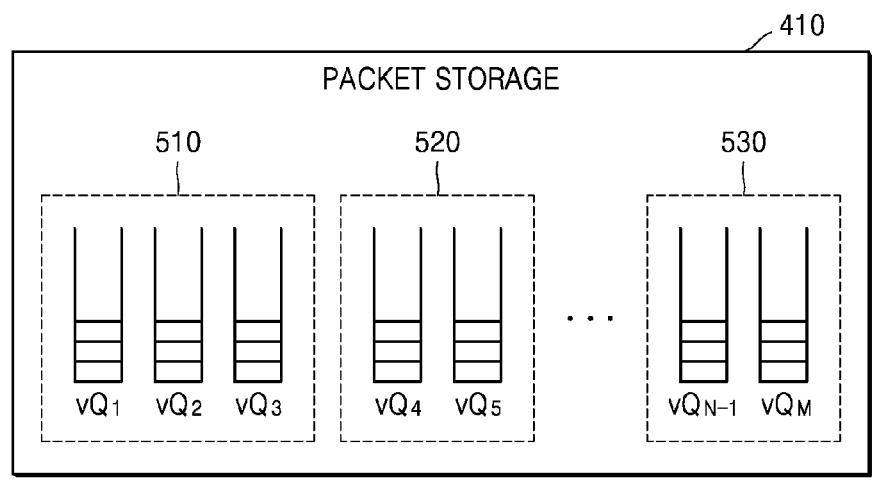
FIG. 5 is a diagram illustrating a configuration of a packet storage according to an embodiment of the disclosure.

The packet storage 410 is implemented as a memory or the like, and includes one or more queues. In an embodiment of the disclosure, the packet storage 410 may include one or more queue groups allocated to each of VPMs. Also, one or more sub-queues belonging to each queue group are divided in the unit of deep flow. Alternatively, the packet storage 410 may include queues that are divided in the unit of deep flow without being divided into queue groups. Queues are illustrated in FIG. 5.

The packet storage 410 stores the packet in a queue in the unit of deep flow identified by the packet identifier 400. In this case, the packet storage 410 may store the packet in various ways, for example, may directly store the packet received from the physical network 310, may store a decapsulated packet, or may store a packet that is processed to be transmitted to the virtualization network according to embodiments. However, for convenience of explanation, it is assumed that the 'packet' processed in the packet processing apparatus 200 includes any of the above cases.

Figure 6:
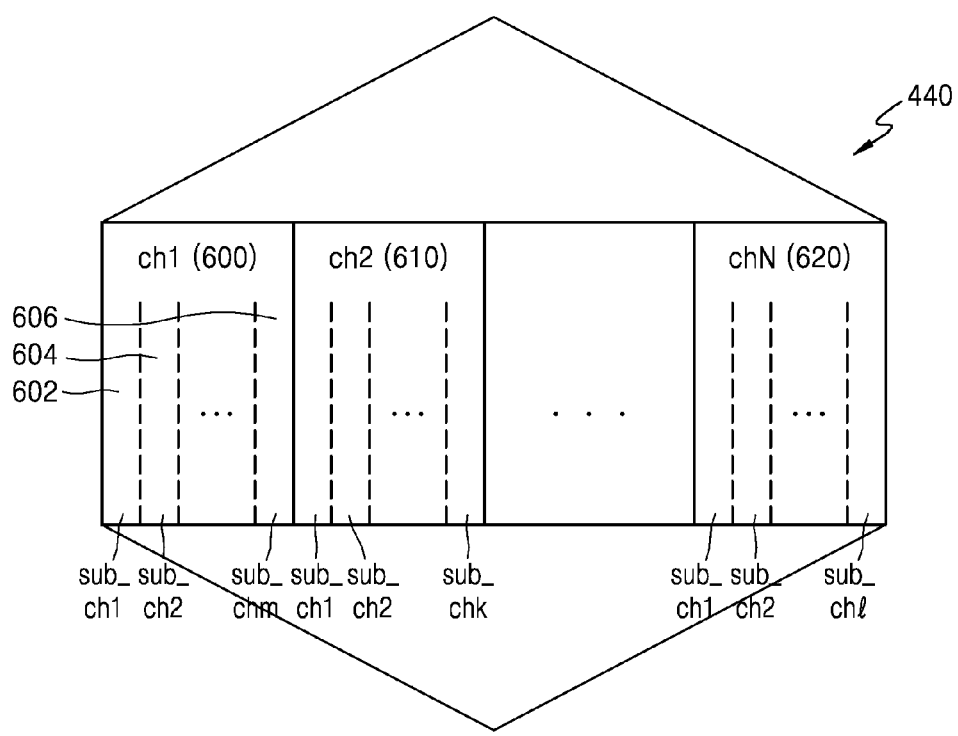
FIG. 6 is a diagram of a channel according to an embodiment of the disclosure.
Figure 7:
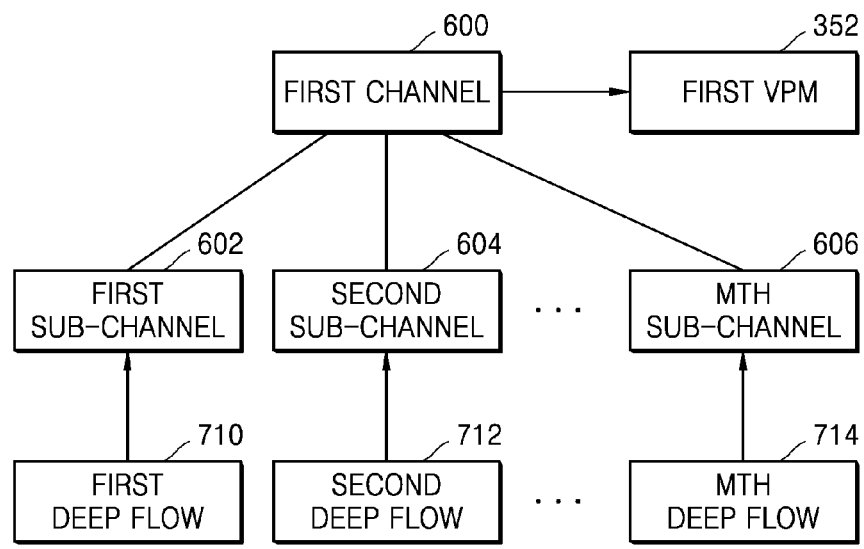
FIG. 7 is a diagram illustrating a mapping relation between a deep flow and a sub-channel according to an embodiment of the disclosure.
Figure 8:
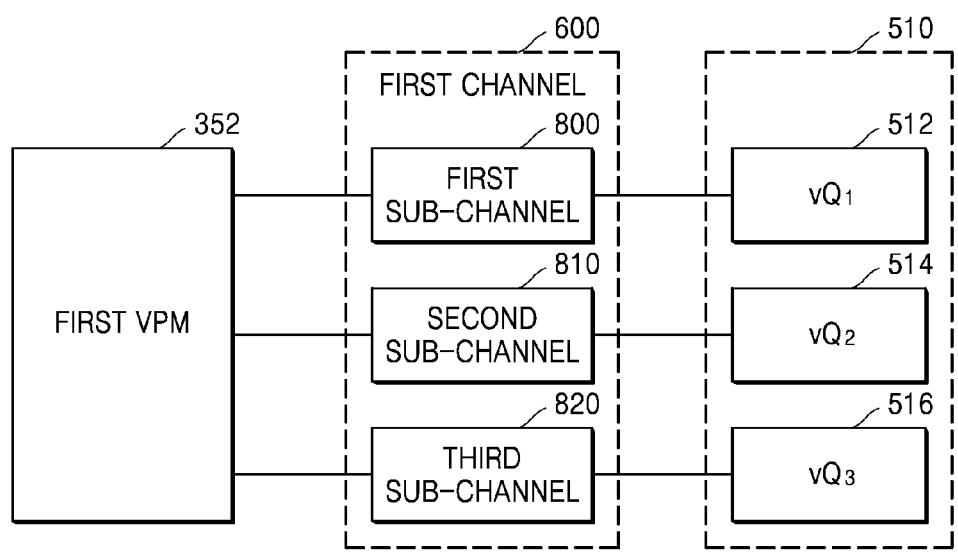
FIG. 8 is a diagram illustrating a deep flow-based single connection relation to an end of a virtualization server through a sub-channel according to an embodiment of the disclosure.
Figure 9:
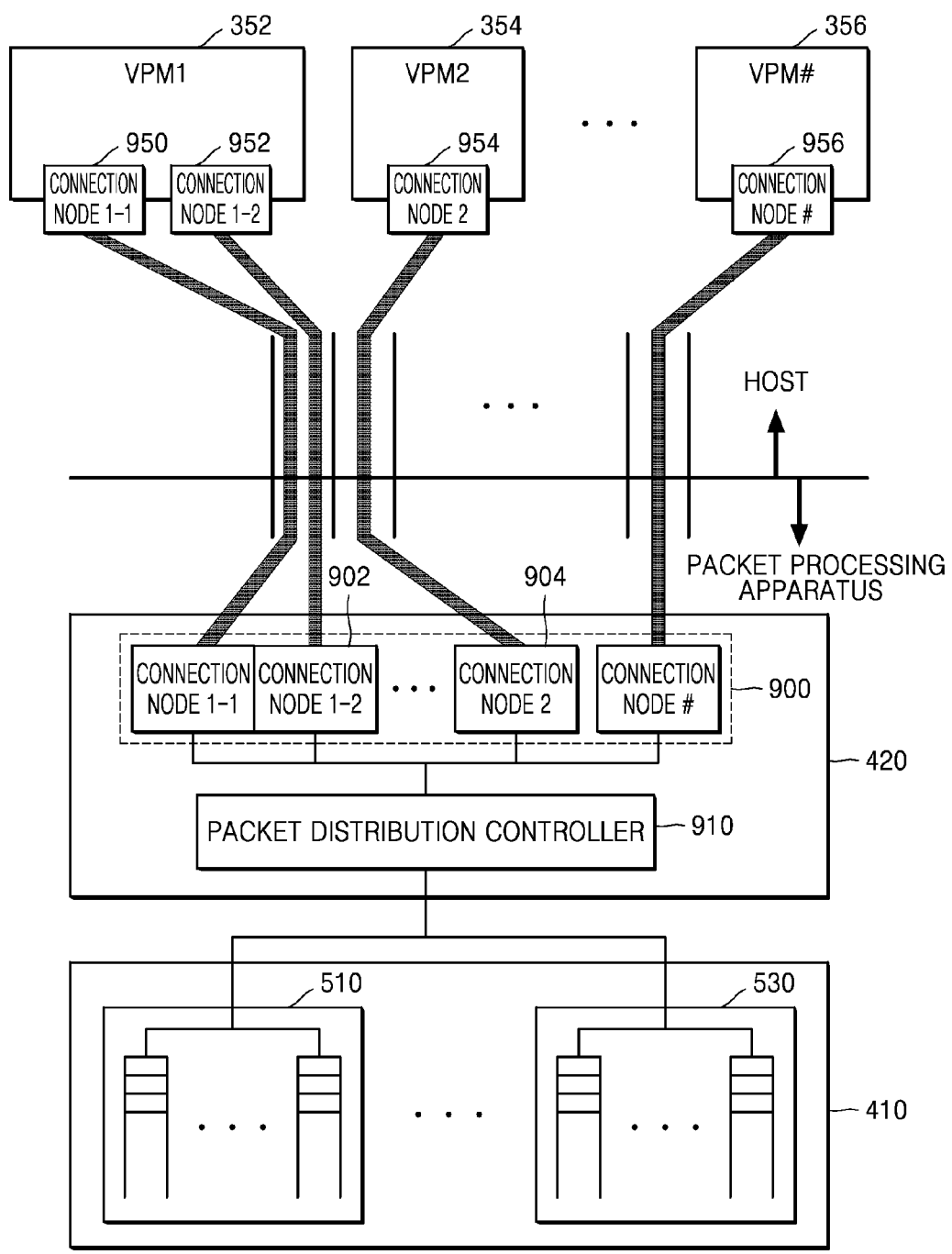
FIG. 9 is a diagram illustrating a structure of a packet distributer that distributes packets through sub-channels according to an embodiment of the disclosure.

The packet distributer 420 transmits the packet stored in the packet storage 410 to the host 320 through the channel 440. In this case, the packet distributer 420 transmits the packet to the host 320 through a sub-channel mapped to the deep flow. A channel between the packet processing apparatus 200 and the host 320 is illustrated in FIG. 6, a mapping relation between the sub-channel and the deep flow is illustrated in FIG. 7, and a method of transmitting the packet through the sub-channel based on the deep flow is illustrated in FIGS. 8 and 9. A detailed configuration of the packet distributer 420 will be described below with reference to FIGS. 6 through 10.

The scheduler 430 generates and stores a mapping relation between one or more deep flows and queues generated for VPMs. For example, after the packet identifier 400 receives the packet from the physical network 310 and identifies the deep flow, the packet identifier 400 requests the scheduler 430 for queue information about a queue where the deep flow is to be stored. The scheduler 430 provides the requested queue information mapped to the deep flow to the packet identifier 400 or the packet storage 410. If there is no mapping relation, the scheduler 430 generates a new mapping relation for the deep flow and provides corresponding queue information to the packet identifier 400 or the packet storage 410. The packet storage 410 stores the packet in a corresponding queue based on the mapping relation.

The scheduler 430 may also determine a mapping relation between the deep flow and the sub-channel. The packet distributer 420 distributes the packet stored in each queue to the sub-channel in the unit of deep flow by using the mapping relation stored in the scheduler 430. A packet distribution method of the packet distributer 420 will be described below with reference to FIG. 9. In another embodiment of the disclosure, the packet distributer 420 may determine and store a mapping relation between the deep flow and the sub-channel.

FIG. 5 is a diagram illustrating a configuration of the packet storage 410 according to an embodiment of the disclosure.

Referring to FIG. 5, the packet storage 410 includes one or more queue groups, e.g., first, second, . . . , and $N^{th}$ queue groups 510, 520, . . . , and 530, each including at least one sub-queue. Each of the first, second, . . . , and $N^{th}$ queue groups 510, 520, . . . , and 530 is mapped to at least one VPM. Each sub-queue in each of the first, second, . . . , and $N^{th}$ queue groups 510, 520, . . . , and 530 is mapped to at least one deep flow.

For example, the first queue group 510 may be mapped to a first VPM, the second queue group 520 may be mapped to a second VPM, and the $N^{th}$ queue group 530 may be mapped to an $N^{th}$ VPM. In this case, when a destination VPM of a packet is the second VPM and a deep flow of the packet is a second deep flow, the packet may be stored in a second sub-queue vQ5 of the second queue group 520.

Alternatively, because the number of queue groups 510, 520, . . . , and 530 and the number of VPMs may be different from each other, one queue group and at least two or more VPMs may be mapped to each other, or one VPM and at least two or more queue groups may be mapped to each other.

A sub-queue in at least one queue group mapped to one VPM may be dynamically generated or removed based on a deep flow belonging to a VPM mapped to the queue group.

FIG. 6 is a diagram of a channel according to an embodiment of the disclosure.

Referring to FIG. 6, one or more channels 600, 610, . . . , and 620 are located between a packet processing apparatus and a host. Each of the channels 600, 610, . . . , and 620 includes one or more sub-channels 602, 604, . . . , and 606. For example, it is assumed that the packet processing apparatus and the host are connected by PCIe and N channels are provided. In this case, N channels 600, 610, . . . , and 620 are not directly used in the present embodiment of the disclosure, and each of the N channels 600, 610, . . . , and 620 is divided into the sub-channels 602, 604, . . . , and 606.

Each of the channels 600, 610, . . . , and 620 may be divided into the same number of sub-channels or a different number of sub-channels. For example, the first channel 600 may include m sub-channels, the second channel 610 may include k sub-channels, and the $N^{th}$ channel 620 may include one sub-channel.

FIG. 7 is a diagram illustrating a mapping relation between a deep flow and a sub-channel according to an embodiment of the disclosure. For convenience of explanation, one channel is illustrated in the present embodiment of the disclosure.

Referring to FIG. 7, the first VPM 352 is allocated to the first channel 600. Accordingly, the packet processing apparatus 200 and the first VPM 352 transmit/receive a packet through the first channel 600. When the packet is transmitted/received by using only the first channel 600, it is difficult to ensure deep flow-based quality of service (QoS) transmitted/received between the packet processing apparatus 200 and the first VPM 352.

In order to ensure QoS, in the present embodiment of the disclosure, the first channel 600 is divided into the plurality of sub-channels 602, 604, . . . , and 606 as shown in FIG. 6 and the sub-channels 602, 604, . . . , and 606 are mapped to deep flows 710, 712, . . . , and 714. A mapping relation between the sub-channels 602, 604, . . . , and 606 and the deep flows 710, 712, . . . , and 714 may be performed by the scheduler 430 or the packet distributer 420.

For example, when the first channel 600 includes m sub-channels and there are m deep flows 710, 712, . . . , and 714 for the first VPM 352, the deep flows 710, 712, . . . , and 714 and the sub-channels 602, 604, . . . , and 606 may be mapped to each other in a one-to-one manner. That is, the first channel 600 may be divided into the sub-channels 602, 604, . . . , and 606, the number of which corresponds to the number of deep flows for the first VPM 352.

In another embodiment of the disclosure, the number of sub-channels and the number of deep flows may be different from each other. For example, the first channel 600 may be previously divided into a pre-defined number of sub-channels. Alternatively, the first channel 600 may not generate sub-channels as many as deep flows due to physical or logical limitations. As such, when the number of sub-channels and the number of deep flows are different from each other, two or more deep flows may be mapped to one sub-channel, or two or more sub-channels may be mapped to one deep flow. Alternatively, some sub-channels may be left empty for another use.

FIG. 8 is a diagram illustrating a deep flow-based single connection relation to a virtualization server through a sub-channel according to an embodiment of the disclosure.

Referring to FIG. 8, a deep flow-based single connection relation is formed between each of queues 512, 514, and 516 of the first queue group 510 of the packet processing apparatus 200 and the first VPM 352. In the present embodiment of the disclosure, for convenience of explanation, it is assumed that the first channel 600 allocated to the first VPM 352 includes three sub-channels, e.g., first through third sub-channels 800, 810, and 820, and the first queue group 510 allocated to the first VPM 352 also includes three queues, e.g., the first through third queues 512, 514, and 516 allocated to a deep flow.

In this case, the first queue 512 of the first queue group 510 is connected to the first VPM 352 through the first sub-channel 800, the second queue 514 is connected to the first VPM 352 through the second sub-channel 810, and the third queue 516 is connected to the first VPM 352 through the third sub-channel 820. Accordingly, a packet stored in the unit of deep flow in each of the first through third queues 512, 514, and 516 may be transmitted to the first VPM 352 through each of the first through third sub-channels 800, 810, and 820 without a bottleneck. That is, a deep flow-based single connection structure to the virtualization server may be formed.

FIG. 9 is a diagram illustrating a structure of the packet distributer 420 that distributes packets through sub-channels according to an embodiment of the disclosure.

Referring to FIG. 9, the packet distributer 420 includes one or more connection nodes 900 and a packet distribution controller 910. The connection nodes 900 are connected to connection nodes 950, 952, 954 and 956 of the VPMs 352, 354, and 356 in the unit of deep flow through sub-channels. For example, the connection nodes 950, 952, 954 and 956 of the VPMs 352, 354, . . . , and 356 may be dynamically generated or removed according to the number of sub-channels and may be implemented as virtualization NICs (vNICs). Although each connection node 900 and each sub-channel are connected to each other in a one-to-one manner for convenience of explanation in the present embodiment of the disclosure, various connection structures such as a 1:N connection structure, a N:1 connection structure, or a N:M connection structure may be formed according to embodiments.

The packet distributer 420 of the present embodiment of the disclosure may be physically or logically implemented. When the packet distributer 420 is physically implemented, because a connection relation and the number of connection nodes 900 are fixed and there may be limitations in application according to the number of VPMs 352, 354 and 356 and the number of identified deep flows, it is preferable to logically implement the packet distributer 420. However, the present embodiment of the disclosure does not exclude but rather includes a case where the packet distributer 420 is physically implemented. However, the following will be described on the assumption that the packet distributer 420 is logically formed.

The packet distributer 420 or the scheduler 430 determines and stores a mapping relation for the connection nodes 900 based on a mapping relation between a deep flow and a sub-channel of each channel. Once the mapping relation is formed, the packet distribution controller 910 performs deep flow-based packet distribution through sub-channels obtained by dividing a channel allocated to a VPM based on the stored mapping relation. For example, when a first queue $vQ_1$ of the first queue group 510 is a queue mapped to a second deep flow of the first VPM 352, the packet distribution controller 910 distributes a packet stored in the first queue $vQ_1$ to a $(1-2)^{th}$ connection node 902. When a second queue $vQ_5$ of the second queue group 520 is a queue mapped to a deep flow of the second VPM 354, the packet distribution controller 910 distributes a packet stored in the second queue $vQ_5$ to a connection node 2 904.

Each of the VPMs 352, 354, . . . , and 356 may include the connection nodes 950, 952, 954, . . . , and 956 to form a deep flow-based connection structure. The connection nodes 950, 952, 954 and 956 may be implemented in various forms regardless of their names. However, the connection nodes 950, 952, 954 and 956 of the VPMs 352, 354 and 356 are out of the scope of the disclosure, and thus a detailed explanation thereof will not be given.

According to an embodiment of the disclosure, the number or a type of deep flows, the number of queue groups, and the number of sub-queues per queue group may be dynamically changed. For example, the scheduler 430 may dynamically change through generation or removal of the number of deep flows, the number of queue groups, the number of sub-queues per queue group, and the number of sub-channels per channel considering various conditions such as a load of a packet processing apparatus and a load of a host. When the amount of packets for the first VPM 352 increases, the scheduler 430 may increase the number of sub-queues of a queue group of the packet storage 410 corresponding to the first VPM 352. Alternatively, the scheduler 430 may newly generate a deep flow for QoS to ensure the QoS with a priority.

As deep flows, etc. are dynamically changed, the packet distributer 420 may dynamically change the connection nodes 900 accordingly. For example, the packet distributer 420 may increase/reduce the number of connection nodes 900 as the number of queues of the packet storage 410 and the number of sub-channels increase/decrease. Also, the packet distributer 420 or the scheduler 430 may determine, store, and manage a new mapping relation as the connection nodes 900 increase/decrease.

Figure 10:
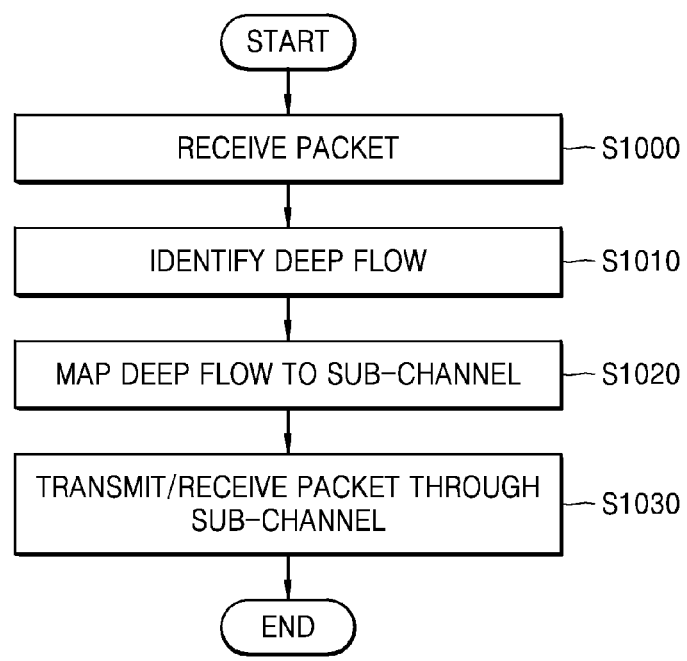
FIG. 10 is a flowchart of a packet processing method in a multi-layered network according to an embodiment of the disclosure.

FIG. 10 is a flowchart of a packet processing method in a multi-layered network according to an embodiment of the disclosure.

Referring to FIG. 10, in operation S1000, the packet processing apparatus 200 receives a packet including layer information of at least one or more second networks from a first network. In operation S1010, the packet processing apparatus 200 identifies a deep flow for the packet based on the layer information of the at least one or more second networks included in the packet. For example, the packet processing apparatus 200 may generate a packet group for each destination VPM based on the layer information of the at least one or more second networks included in the packet and may identify the deep flow of the packet based on the layer information of the at least one or more second networks in the packet group. The packet processing apparatus 200 may use L3 or higher layer information of the at least one or more second networks to identify the deep flow.

Such a deep flow identification method identifies the deep flow not only by using the layer information of the one second network that is overlayed in the first network but also, when two more networks are sequentially overlayed in the first network, by using layer information of the two more networks. Also, the deep flow identification method is not limited to a case where the deep flow identification method is performed by the packet processing apparatus 200 located between the first network and the at least one second network, and the deep flow identification method may be performed by a virtualization module between two virtualization networks that are overlayed in the first network according to an embodiment of the disclosure.

In operation S1020, the packet processing apparatus 200 maps at least one deep flow to at least one sub-channel obtained by dividing a channel allocated to a VPM located in the at least one second network, and in operation S1030, the packet processing apparatus 200 transmits the packet to the VPM through the sub-channel.

The packet processing apparatus 200 may use a packet distributer in order to distribute a packet stored in a queue to a corresponding sub-channel. For example, the packet processing apparatus 200 may generate at least one connection node mapped to each sub-channel of each channel in the packet distributer and may determine and store a mapping relation between at least one deep flow and each connection node.

According to the one or more embodiments, because a packet is identified and processed in the unit of flow between two networks of a multi-layered network environment, processor affinity may be improved and parallel processing efficiency may be improved. Also, because a load of a virtual switch is distributed, network processing efficiency of a virtualization server may be improved. Also, because queues and channels are allocated and processed in the unit of deep flow, scalable communication processing that guarantees QoS between ends of the virtualization server may be performed.

The disclosure may be embodied as computer-readable code on a computer-readable recording medium. The computer-readable recording medium includes any storage device that may store data which may be read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed over network-coupled computer systems so that the computer-readable code is stored and executed in a distributed fashion.

While the disclosure has been particularly shown and described with reference to embodiments thereof, it will be understood by one of ordinary skill in the art that various changes in form and details may be made therein without departing from the spirit and scope of the disclosure as defined by the appended claims. The embodiments should be considered in descriptive sense only and not for purposes of limitation. Therefore, the scope of the disclosure is defined not by the detailed description of the disclosure but by the appended claims, and all differences within the scope will be construed as being included in the disclosure.

What is claimed is:

1. A packet processing method in a multi-layered network, the packet processing method comprising:
   receiving a packet comprising layer information of at least one second network from a first network;
   identifying a deep flow for the packet based on the layer information of the at least one second network included in the packet;
   mapping at least one deep flow to at least one sub-channel obtained by dividing a channel allocated based on a virtual processing module (VPM) located in the at least one second network; and
   transmitting the packet or another packet generated by processing the packet to the VPM through the at least one sub-channel,
   wherein the identifying of the deep flow for the packet comprises:
   distinguishing a packet group according to each destination VPM; and
   identifying the deep flow of the packet based on the layer information of the at least one second network in the packet group,
   wherein the identifying of the deep flow comprises identifying different deep flows by using L3 or higher layer information of the at least one second network.

2. The packet processing method of claim 1, wherein the channel is located between a network interface device and a host where a virtualization processing model exists.

3. The packet processing method of claim 1, wherein the channel includes a peripheral component interconnect express (PCIe) channel.

4. The packet processing method of claim 1, further comprising:
   allocating a queue group comprising at least one queue to each VPM; and
   selecting a queue in a queue group where the packet is to be stored based on the deep flow.

5. The packet processing method of claim 1, wherein the mapping of the at least one deep flow to the at least one sub-channel comprises:

generating at least one connection node mapped to each sub-channel of each channel; and mapping each connection node to at least one deep flow.

6. The packet processing method of claim 5, wherein the transmitting the packet to the VPM comprises distributing the packet to a corresponding connection node based on the deep flow.

7. A packet processing apparatus comprising:
a packet identifier configured to, based on layer information of a second network included in a packet received from a first network, identify a deep flow for the packet;
a scheduler configured to map at least one deep flow to at least one sub-channel obtained by dividing a channel allocated based on a virtual processing module (VPM) located in the second network; and
a packet distributer configured to transmit the packet or another packet generated by processing the packet to the VPM through the at least one sub-channel,
wherein the packet identifier is further configured to distinguish a packet group according to each destination VPM, and identify the deep flow of the packet based on the layer information of the at least one second network in the packet group,
wherein the packet identifier is further configured to identify different deep flows by using L3 or higher layer information of the at least one second network.

8. The packet processing apparatus of claim 7, further comprising a queue group comprising at least one queue and allocated to each VPM,
wherein the packet identifier is further configured to store the packet in a queue in a corresponding queue group in the unit of deep flow.

9. The packet processing apparatus of claim 7, wherein the channel is located between a network interface device and a host where the VPM exists.

10. The packet processing apparatus of claim 7, wherein the packet distributor comprises:
at least one connection node mapped to each sub-channel; and
a packet distribution controller configured to perform packet distribution based on a mapping relation between each connection node and the deep flow.

11. A non-transitory computer-readable recording medium having embodied thereon a program for executing the packet processing method of claim 1.

* * * * *